United States Patent Office 3,851,006
Patented Nov. 26, 1974

3,851,006
PROCESS FOR THE SEPARATION OF
PINENE ISOMERS
Armand J. De Rosset, Clarendon Hills, and Richard W. Neuzil, Downers Grove, Ill., assignors to Universal Oil Products Company, Des Plaines, Ill.
No Drawing. Filed July 23, 1973, Ser. No. 382,099
Int. Cl. C01b 33/28; C07c 13/00; C09f 3/02
U.S. Cl. 260—675.5                16 Claims

ABSTRACT OF THE DISCLOSURE

A process for the separation of alpha- and beta-pinene from a feed mixture containing the two isomers which employs a crystalline aluminosilicate adsorbent containing a particular cation or cations to selectively adsorb one of the isomers from the feed mixture. The feed stock contacts an adsorbent which allows one isomer from the feed mixture to be selectively adsorbed and the adsorbed isomer is thereafter recovered from the adsorbent in a more concentrated form as compared to its concentration in the feed stock. The process can be performed in either the liquid or vapor phase.

A specific example of the process disclosed herein is a process which comprises the steps of: contacting the feed mixture at adsorption conditions with a crystalline aluminosilicate adsorbent selected from the group consisting of type X and type Y zeolites containing a selected cation or cations at the exchangeable sites within the zeolite thereby selectively adsorbing beta-pinene; withdrawing from the adsorbent a stream comprising less selectively adsorbed alpha-pinene contacting the adsorbent at desorption conditions with a desorbent material to effect the removal of beta-pinene from the adsorbent; and, withdrawing from the adsorbent a stream comprising desorbent material and beta-pinene.

BACKGROUND OF THE INVENTION

Field of the Invention

The field of art to which the claimed invention pertains is solid-bed adsorptive separation. More specifically, the claimed invention relates to a process for the separation of pinene isomers using a solid adsorbent which selectively removes one of the isomers from a feed mixture.

Description of the Prior Art

It is well known in the separation art that certain crystalline aluminosilicates can be used to separate hydrocarbons species from mixtures thereof. In particular, the separation of normal paraffins from branched chained paraffins can be accomplished by using the type A zeolites which have pore openings from 3 to about 5 angstroms. Such a separation process is disclosed for example in U.S. Pats., 2,985,589 and 3,201,491. These adsorbents allow a separation based on the physical size differences in the molecules by allowing the smaller or normal hydrocarbons to be passed into the cavities within the crystalline aluminosilicate adsorbent, while excluding the larger or branched chain molecules.

U.S. Pats. 3,265,750 and 3,510,423 for example disclose processes in which larger pore diameter zeolites such as the type X or type Y structured zeolites can be used to separate olefinic hydrocarbons.

In addition to separating hydrocarbon types, the type X or type Y zeolites have also been employed in processes to separate individual hydrocarbon isomers. In the process described in U.S. Pats. 3,558,730; 3,558,732; 3,626,020 and 3,686,342 for example they are used to separate desired xylene isomers; in U.S. Pat. 3,668,267 they are used to separate particular alkyl substituted naphthalenes.

The present invention relates to a process for the separation of the isomeric bicyclic terpenes alpha- and beta-pinene.

We have found that type X and type Y structured crystalline aluminosilicate zeolites containing one or more selected cations exhibit selectivity for one pinene isomer with respect to the other thereby making separation by solid-bed selective adsorption possible. The prior art has neither disclosed nor suggested a process by which the highly reactive isomeric bicyclic terpenes alpha- and beta-pinene can be separated with a particular zeolitic adsorbent.

SUMMARY OF THE INVENTION

It is accordingly, a broad objective of our invention to provide a process for the separation of alpha- and beta-pinenes from a feed mixture containing these isomers.

In brief summary our invention is, in one embodiment, a process for separating pinene isomers from a feed mixture containing them which process comprises contacting the mixture with a crystalline aluminosilicate selected from the group consisting of type X structured and type Y structured zeolites containing one or more selected cations at exchangeable cationic sites of said zeolite thereby selectively adsorbing at adsorption conditions one of the isomers from said feed and thereafter recovering the selectively adsorbed isomer.

Other embodiments and objects of the present invention encompass details about feed mixtures, adsorbents, desorbents and operating conditions all of which are hereinafter disclosed in the following discussion of each of these facets of the present invention.

The process of this invention provides a superior alternative to distillation and gas chromatography separation techniques for the separation of mixtures of pinenes into relatively high purity alpha- and beta-pinene fractions. Beta-pinene in particular finds specific use in the fragrance industry as a starting material in the manufacture of aroma chemicals.

DESCRIPTION OF THE INVENTION

Adsorbents which can be used in the process of this invention are generally referred to as crystalline aluminosilicates or molecular sieves and can comprise both the natural and synthetic aluminosilicates. Particular crystalline aluminosilicates encompassed by the present invention include aluminosilicate cage structures in which the alumina and silica tetrahedra are intimately connected in an open three dimensional network. The tetrahedra are cross-linked by the sharing of oxygen atoms with spaces between the tetrahedra occupied by water molecules prior to partial or total dehydration of this zeolite. The dehydration of the zeolite results in crystals interlaced with cells having molecular dimensions. Thus, the crystalline aluminosilicates are often referred to as molecular sieves when the separation which they effect is dependent essentially upon distinction between molecule sizes. In the process of this invention, however, the term molecular sieves is not strictly suitable since the separation of isomers is dependent on electrochemical attraction of different isomer configurations rather than pure physical size differences in the isomer molecules.

In hydrated form, the crystalline aluminosilicates generally encompass those zeolites represented by the formula 1 below:

FORMULA 1

$$M_{2/n}O:Al_2O_3:wSiO_2:yH_2O$$

where "M" is a cation which balances the electrovalence of the tetrahedra and is generally referred to as an exchangeable cationic site, "$n$" represents the valence of the cation, "$w$" represents the moles of $SiO_2$ and "$y$" represents the moles of water. The cations may be any one of a number of cations which will hereinafter be described in detail.

The type X structured and type Y structured zeolites as used in this specification shall include crystalline aluminosilicates having a three dimensional interconnected cage structure and can specifically be defined by U.S. Pats. 2,882,244 and 3,120,007. The terms "type X structured" and "type Y structured" zeolites shall include all zeolites which have a general structure as represented in the above two cited patents and specifically include those structured containing various cations exchanged upon the zeolite. In the most limiting sense these terms refer to type X and type Y zeolites.

The type X structured zeolites can be represented in terms of mole oxides as represented in formula 2 below:

FORMULA 2

$(0.9 \pm 0.2)M_{2/n}O : Al_2O_3 : (2.5 \pm 0.5)SiO_2 : yH_2O$ where "M" represents at least one cation having a valence of not more than 3, "n" represents the valence of "M" and "y" is a value up to about 9 depending upon the identity of "M" and the degree of hydration of the crystalline structure.

The type Y structured zeolites can be represented in terms of the mole oxides for the sodium form as represented by formula 3 below:

FORMULA 3

$(0.9 \pm 0.2)Na_2O : Al_2O_3 : wSiO_2 : yH_2O$ where "w" is a value of greater than about 3 up to 8, and "y" may be any value up to about 9.

Adsorbents contemplated herein include not only the sodium form of the type Y zeolite but also crystalline materials obtained from such a zeolite by partial or complete replacement of the sodium cation with other individual cations or group of cations. Similarly, the type X zeolite also may be ion-exchanged.

Cationic or base exchange methods are generally known to those familiar with the field of crystalline aluminosilicate production. They are generally performed by contacting the zeolite with an aqueous solution of the soluble salt of the cation or cations desired to be placed upon the zeolite. The desired degree of exchange takes place before the sieves are removed from the aqueous solution, washed and dried to a desired water content. It is contemplated that cation exchange operations may take place using individual solutions of desired cations placed on the zeolite or using an exchange solution containing a mixture of cations, where two or more desired cations are placed on the zeolite.

The cations which may be placed upon the zeolite include cations selected from, but not limited to the Group I-A, Group II-A and Group I-B metals. Specific cations which show a preferential selectivity for beta-pinene with respect to alpha-pinene isomers include lithium, sodium, potassium, rubidium, cesium, beryllium, magnesium, calcium, strontium, and barium. Where the above cations are used, beta-pinene would be the preferentially adsorbed component of the feed mixture. In the process of this invention we have found that the Type X or Type Y zeolites containing sodium or barium or potassium as the selected single cation are particularly preferred.

The following combinations of cations have also been shown to be suited for the separation of pinene isomers. The cation combinations include potassium and barium, potassium and beryllium, potassium and manganese, rubidium and barium, cesium and barium, copper and cadmium, copper and silver, zinc and silver, and copper and potassium, with the barium and potassium combination being particularly preferred.

When singular cations are based exchanged upon a zeolite the singular cations can comprise anywhere from 5 up to 75 wt. percent on a relative volatile free basis of the zeolite depending upon the molecular weight of the material exchanged upon the zeolite. It is contemplated that when single ions are placed upon the zeolite that they may be on the zeolite in concentrations of from about 1% to about 100% of the original cations present (generally sodium) upon the zeolite prior to its being ion-exchanged. By knowing the empirical formula including the silica to alumina ratio of the zeolite used, its water content, and the percentage of binder used if any, it is possible to calculate the percentage of ion exchange that has taken place.

When two or more cations are placed upon the zeolite there are two parameters in which one can operate in order to effectively produce a zeolite having the maximum selective properties. One of the parameters is the extent of the zeolite ion exchange which is determined by the length of time, temperature and cation concentration. The other parameter is the ratio of individual cations placed on the zeolite. In instances in which the cation pairs comprise a Group I-A metal and a Group II-A metal the weight ratio of these two respective components upon the zeolite can vary anywhere from about less than one up to about one hundred depending upon the molecular weight of the Group I-A or Group II-A metal.

Because of the highly reactive nature of the pinenes it is very important that the adsorbent possess little or no catalytic activity toward pinene polymerization or isomerization which would either degrade the product quality, reduce the overall yield of desired product or possibly degrade adsorbent performance. We have found that the isomerization effects of the adsorbent are of primary concern. Unless the adsorbent possesses little or no isomerization activity, beta-pinene will be converted to alpha-pinene and dipentene. It is thought that such activity is due primarily to the presence of hydrogen cations within the zeolite or the binder used to produce the adsorbent particles. We have discovered that ion-exchanging the Type X or Type Y zeolitic adsorbent with a dilute aqueous solution of sodium or potassium hydroxide eliminates such acid sites and produces an adsorbent with little or no catalytic activity. This ion-exchange step may then be followed by further ion-exchanges as desired. During any subsequent ion-exchange steps and washes it is important that the pH of the exchange medium be maintained at or above 7 to avoid re-creating acid sites.

In the process of this invention we have additionally found that a small amount of water on the adsorbent is beneficial to improve desorption rates thereby promoting reasonably sharp isomer separation and preventing "tailing." The preferred range of water on the adsorbent is from about 0.5 to about 5 wt. percent on a volatile-free basis. This desired range can be maintained by intermittent or preferably continuous water addition to the process.

In this specification, the volatile matter content (generally water) of the zeolitic adsorbent is determined by first weighing the adsorbent and thereafter contacting the adsorbent in a high temperature furnace at 900° C. under an inert purge gas stream such as nitrogen for a period of time sufficient to achieve a constant weight. The sample is then cooled under an inert atmosphere and weighed to determine the difference in weight between the adsorbent before it was passed into the oven and afterwards. The difference in weight is calculated as a loss on ignition (LOI) and represents the volatile matter present within the adsorbent. A specific example would be a 100-gram sample of the zeolitic adsorbent placed into a muffle furnace at about 900° C. for a period of 5 to 6 hours with a dry nitrogen purge gas passing over the zeolite. The zeolite is then removed from the furnace, cooled under an inert atmosphere, and reweighed yielding a total weight of about 95 grams. On this basis, the original adsorbent can be said to have contained 5 wt. percent volatile matter. The chemical analyses performed on the zeolites are based on volatile-free matter and are determined by taking into account the amount of material which is lost by determination of volatile matter and correcting the individual chemical analysis in weight percent to take this factor into consideration.

Alpha-pinene is one of the most important hydrocarbons of the entire terpene family. It is found in nearly all essential oils. The most common source of pinene is terpentine with alpha- and beta-pinene constituting the major components. Turpentine varies somewhat in composition, depending upon its source, but consists principally of alpha-pinene together with varying amounts of beta-pinene. It is contemplated therefore that turpentine will be the most common feed mixture for the process of our invention. Feed mixtures to our process may contain as diluents components other than the pinene isomers which are generally less selectively adsorbed (if at all) in this adsorption system and in which the pinenes are soluble.

With boiling points of 156° C. and 165° C. respectively for alpha- and beta-pinene the isomers can of course be separated by distillation. As will be further described below, however, by the selective adsorption process of our invention a selectivity value of greater than 2 can be obtained as compared to the relative volatility factor of 1.3 that exists between the two isomers. The process of our invention thus offers a more efficient method of separating these two isomers into high purity fractions of alpha- and beta-pinene.

The term "desorbent materials" as used herein means any substance capable of removing the selectively adsorbed isomer from the adsorbent. Desorbent materials which can be used in the process of this invention should be substances which are easily separable from the feed mixture that is passed into the process. In desorbing the preferentially adsorbed component of the feed both desorbent and the desorbed feed component are removed from the adsorbent in admixture. Without a method of separation of these two materials, the purity of the selectively adsorbed component of the feed stock would not be very high since it would be diluted with desorbent. It is contemplated that a desorbent material having a different boiling range than the feed mixture used should be used in this process. The boiling range of the desorbent material could be higher or lower than that of the feed mixture. The use of a different boiling range allows a simple separation by fractionation or other methods to remove desired feed components from the desorbent and allow reuse of the desorbent in the process. Desorbent materials which can be used in the process of this invention include paraffins, olefins, aromatics, ethers, alcohols, cyclic dienes and the ketones all of which are preferred to have lower boiling points than the pinenes. Particularly preferred desorbent materials are linear olefins especially those having from about 4 to 8 carbon atoms per molecule or mixture of such olefins and paraffins of the same carbon number range. Gaseous materials such as nitrogen, hydrogen, methane, ethane, etc., could also be used as a desorbent material where the desorption operation takes place by a purging step.

Adsorption and desorption conditions can be both liquid and vapor phase. The liquid phase operations for both adsorption and desorption are preferred because of the lower temperature requirements and the slightly improved selectivities associated with the lower temperatures.

Because of the very reactive nature of the pinenes we have found the range of process temperatures for both adsorption and desorption is somewhat critical. We have found that at temperatures much above 150° F. the two isomers are converted to other identified products. The preferred temperature range for both adsorption and desorption is therefore from about 70° F. to about 150° F.

Pressures which can be used in the process include those in the range of above about atmospheric to about 500 p.s.i.g. Higher pressure operations do not appear to affect the selectivity to a measurable amount and additionally increase the cost of equipment. Desorption conditions can include the same range of temperatures and pressures as described for adsorption operations. The desorption of the selectively adsorbed isomer can be effected at reduced pressures or elevated temperatures or both. Vacuum purging of the adsorbent to remove the adsorbed isomer is also contemplated as a desorption step in the process.

The flow schemes which can be utilized to effect the process of this invention include batch type fixed bed systems, the continuous simulated moving-bed systems and the moving-bed systems. In the batch operating processes the feed stock is passed into an adsorbent chamber for a predetermined period of time after which the feed is stopped and any remaining feed present between the adsorbent particles can be purged out of the chamber. A desorbent material may then be passed into the chamber to help remove the adsorbed isomer from the adsorbent. In the continuous fixed bed or moving bed processes, the adsorption and desorption operations are continuously taking place which allows both continuous production of a stream enriched in the desired feed isomer and the continual use of feed and desorbent streams. One specific processing flow scheme which can be utilized to effect the process of this invention includes what is known in the art as the simulated moving-bed countercurrent system. The general operating sequence of such a flow system is described in U.S. Pat. 2,985,589. As applied to our invention therefore one embodiment of our invention is a process for separating pinene isomers from a feed mixture comprising pinene isomers which process comprises the steps of: contacting said mixture at adsorption conditions with a particular zeolitic adsorbent thereby selectively adsorbing one of the pinene isomers; withdrawing from the adsorbent bed a stream comprising the less selectively adsorbed isomer in the feed; contacting the adsorbent at desorbent conditions with a desorbent material to effect the removal of the selectively adsorbed isomer from the adsorbent; and, withdrawing from the adsorbent a stream comprising desorbent material and the selectively adsorbed isomer.

The selectively adsorbed feed component is commonly referred to as the extract component of the feed stock and the non-selectively adsorbed feed components are referred to as the raffinate components.

With the type of processes employing adsorbents to separate pinene isomers by selective adsorption now in mind, one can appreciate that certain characteristics of adsorbents are highly desirable, if not absolutely necessary, to the successful operation of the selective adsorptive process. Among such characteristics are: the adsorptive capacity for some volume of the desired isomer per volume of adsorbent; the selective adsorption for one pinene isomer with respect to the other isomers and the desorbent; and, as previously mentioned, little or no catalytic activity for undesired reactions such as polymerization and isomerization.

Capacity of the adsorbent for adsorbing a specific volume of one of the pinene isomers is of coure a necessity; without such capacity the adsorbent is useless for adsorptive separation. Furthermore, the higher the adsorbent's capacity for the component to be adsorbed, the better is the adsorbent. Increased capacity of a particular adsorbent makes it possible to reduce the amount of adsorbent needed to separate the desired component contained in a particular charge rate of feed mixture. A reduction in the amount of adsorbent required for a specific adsorptive separation reduces the cost of the separation process. It is important that the good initial capacity of the adsorbent be maintained during actual use in the separation process over some economically desirable life.

The other necessary adsorbent characteristic is the ability of the adsorbent to separate components of the feed, or, in other words, the selectivity, (B), of the adsorbent for one component as compared to another component. Selectivity can be expressed not only for the desired pinene isomer as compared to the other isomers but can also be expressed between any feed stream isomer and the desorbent. The selectivity (B) as used throughout this specification is defined as the ratio of the two components of the adsorbed phase over the ratio of the same two components in the unadsorbed phase at equilibrium conditions.

Selectivity is shown as Equation 1 below:

EQUATION 1

$$\text{Selectivity} = (B) = \frac{[\text{vol. percent C/vol. percent D}]_A}{[\text{vol. percent C/vol. percent D}]_U}$$

where C and D are two components of the feed represented in volume percent and the subscripts A and U represent the adsorbed and unadsorbed phases respectively. The equilibrium conditions as defined here were determined when the feed passing over a bed of adsorbent did not change composition after contacting the bed of adsorbent. In other words, there was no net transfer of material occurring between the unadsorbed and adsorbed phases.

As can be seen where the selectivity of two components approaches 1.0 there is no preferential adsorption of one component by the adsorbent. As the (B) becomes less than or greater than 1.0 there is a preferential selectivity by the adsorbent of one component. When comparing the selectivity of the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. Desorbents ideally would have a selectivity equal to about 1 or slightly less than 1.

It is also necessary that the adsorbent possess little or no catalytic activity toward polymerization or isomerization of the pinene isomers. Such activity might effect adsorbent capacity or selectivity or product yields or all of these. Polymerization tends primarily to degrade the adsorbent in addition to reducing yields somewhat. Polymerization effects are generally considered to be primarily physical impediments which can prevent the olefinic hydrocarbons from passing into the molecular sieve adsorbent by obstructing the surface of the adsorbent and the pores present in the structure of the adsorbent. This shortens the useful life of the adsorbent and makes necessary frequent regeneration treatments to restore the adsorptive properties of the adsorbent. Isomerization activity tends primarily to decrease the yield of the desired isomer and it is the elimination of this activity which we have found to be of primary concern rather than polymerization activity in the process of our invention. It is, therefore, extremely important that the catalytic activity be substantially reduced or preferably totally eliminated by proper methods of manufacture of a selected adsorbent.

While reducing the temperature of the operations of the adsorption process in which the catalytic activity is present will substantially reduce the catalytic activity because of the associated reduction in the rate of reaction, this procedure in adsorptive separation processes employing molecular sieves is generally not desirable because the reduction in temperature also reduces the rates of adsorption and desorption of the selectively adsorbed isomer.

In order to test various adsorbents to measure the characteristics of adsorptive capacity and selectivity, a dynamic testing apparatus is employed. The apparatus consists of an adsorbent chamber of approximately 70 cc. volume having inlet and outlet portions at opposite ends of the chamber. The chamber is contained within a temperature control means and, in addition, pressure control equipment is used to operate the chamber at a constant predetermined pressure. Chromatographic analysis equipment can be attached to the outlet line of the chamber and used to analyze the effluent stream leaving the adsorbent chamber.

A pulse test, performed using this apparatus and the following general procedure, is used to determine selectivities and other data for various adsorbent systems. The adsorbent is filled to equilibrium with a particular desorbent by passing the desorbent through the adsorbent chamber. At a convenient time, a pulse test of feed containing known concentrations of the pinene isomers is injected for a duration of several minutes. For convenience a known concentration of a non-adsorbed tracer such as n-nonane may be included in the feed. Desorbent flow is resumed, and the tracer (if one is employed) and the pinene isomers are eluted as in liquid-solid chromatographic operation. The effluent can be analyzed by on-stream chromatographic equipment and traces of the envelopes of corresponding component peaks developed. Alternatively, effluent samples can be collected periodically and later analyzed separately by gas chromatography.

From information derived from the chromatographic traces, adsorbent performance can be rated in terms of capacity index for the adsorbed isomer, selectivity for one pinene isomer with respect to the other, and the rate of desorption of adsorbed isomer by the desorbent. The capacity index is characterized by the distance between the center of the peak envelope of the selectively adsorbed isomer and the peak envelope of the tracer component or some other known reference point. It is expressed in terms of the volume in cubic centimeters of desorbent dumped during this time interval. Selectivity, (B), for the adsorbed isomer with respect to the non-adsorbed isomer is characterized by the ratio of the distance between the center of the adsorbed isomer peak envelope and the tracer peak envelope (or other reference point) to the corresponding distance for the other (non-adsorbed) isomer. The rate of exchange of the adsorbed isomer with the desorbent can generally be characterized by the width of the peak envelopes at half intensity. The narrower the peak width the faster the desorption rate. The desorption rate can also be characterized by the distance between the center of the tracer peak envelope and the disappearance of the selectively adsorbed isomer which has just been desorbed. This distance is again the volume of desorbent pumped during this time interval.

To translate this type of data into a practical pinene separation process requires actual testing of the best system in a continuous countercurrent liquid-solid contacting device. The general operating principles of such a device have been previously described and are found in Broughton U.S. Pat. 2,985,589. A specific laboratory-size apparatus utilizing these principles is described in de Rosset et al. U.S. Pat. 3,706,812. The equipment comprises multiple adsorbent beds with a number of access lines attached to distributors within the beds and terminating at a rotary distributing valve. At a given valve position, feed and desorbent are being introduced through two of the lines and raffinate and extract are being withdrawn through two more. All remaining access lines are inactive and when the position of the distributing valve is advanced by one index all active positions will be advanced by one bed. This simulates a condition in which the adsorbent physically moves in a direction countercurrent to the liquid flow. Additional details on the above-mentioned adsorbent testing apparatus and adsorbent evaluation techniques may be found in the paper, "Separation of $C_8$ Aromatics by Adsorption," by A. J. de Rosset, R. W. Neuzil, D. J. Korous and D. H. Rosback presented at the American Chemical Society, Los Angeles, Calif., Mar. 28 through Apr. 2, 1971.

The feasibility of separating pinene isomers by selective adsorption, which was demonstrated by pulse test results, was confirmed by continuous testing in the laboratory-sized apparatus described above.

EXAMPLE

The following example is presented to further illustrate the basis and benefit of the present invention and is not intended to limit the scope of the invention.

This example presents results of pulse tests which were performed using a particular adsorbent primarily to determine selectivities of the adsorbent for one pinene isomer relative to the other with different desorbent materials. The selectivity numbers illustrate the adsorbent's ability to separate the pinene isomers.

The adsorbent was a Type X structured zeolite which contained a small portion of binder material and was approximately 20–40 mesh particle size.

A sodium form Type X structured zeolite has been ion-exchanged first with a dilute aqueous caustic solution for the purpose of eliminating catalytic activity of the final adsorbent. The zeolite was then ion-exchanged with a potassium chloride solution to give a volatile-free potassium oxide content of about 9 wt. percent and the adsorbent was adjusted to a water level of 1.4 wt. percent before it was utilized in the pulse test apparatus. The adsorbent was placed in a 70 cc. adsorbent column which was maintained at 45 or 54° C. with constant pressure of 60 p.s.i.g. during the entire operation. The column effluent was sampled every 2.5 minutes by an automatic sampling chromatograph.

The feed mixture utilized contained 5 vol. percent n-nonane, 17 vol. percent beta-pinene and 78 vol. percent alpha-pinene and was injected via a sample loop into the test column in pulses of 3.6 cc. each. Desorbents materials used comprised the following: a blend of 30 vol. percent hexene-1 and 70 vol. percent iso-pentane; a blend of 50 vol. percent hexene-1 and 50 vol. percent iso-pentane; and 100 vol. percent hexene-1.

The effluent was analyzed by the on-stream chromatographic equipment and traces of the envelopes of component peaks were developed.

From information derived from the chromatographic traces, selectivities of the adsorbent for beta-pinene with respect to alpha-pinene and the volume of desorbent necessary to desorb beta-pinene were obtained in the manner previously described. Results for four tests A, B, C, and D are shown in the Table below.

PINENE SEPARATION PULSE TEST RESULTS

| Test | Desorbent | Temperature, °C. | Selectivity (B), beta-pinene/alpha-pinene | Volume of desorbent to desorb beta-pinene, cc. |
|---|---|---|---|---|
| A | 30 vol. percent hexene-1, 70 vol. percent iso-pentane. | 45 | 4.35 | 156 |
| B | do | 54 | 4.30 | 141 |
| C | 50 vol. percent hexene-1, 50 vol. percent iso-pentane. | 54 | 3.67 | 107.5 |
| D | 100 vol. percent hexene-1 | 54 | 2.79 | 61.4 |

The selectivity values shown for the four tests demonstrate first of all the adsorbent's ability to selectively adsorb beta-pinene with respect to alpha-pinene thereby making separation of the isomers possible. All of the selectivities are well above 2 as compared to the relative volatility factor of 1.3 that exists between the two isomers. The data also indicates the effect of temperatures on the rate of desorption of the selectively adsorbed beta-pinene. Tests A and B used the same desorbent material (30 vol. percent hexene-1 and 70 vol. percent isopentane) but test A was conducted at 45° C. and test B at a higher temperature of 54° C. At the increased temperature, 141 cc. of desorbent were required to desorb beta-pinene as compared to 156 cc. of desorbent at the lower temperature. The data also shows that at the same temperature, increasing the vol. percent of hexene-1 in the desorbent blend from 30 vol. percent in Test B to 50 vol. percent in Test C to 100 vol. percent in Test D improved the efficiency of desorption of beta-pinene. The volume of desorbent decreased from 141 cc. to 107.5 cc. to 61.4 cc. respectively for Tests B, C and D but at the same time selectivities decreased from 4.30 to 3.67 to 2.79, respectively.

We claim as our invention:

1. A process for separating pinene isomer from a feed mixture containing pinene isomers which process comprises contacting said mixture at adsorption conditions with a crystalline aluminosilicate adsorbent selected from the group consisting of type X structured and type Y structured zeolites containing at the exchangeable cationic sites within said zeolite at least one cation selected from the group consisting of lithium, sodium, potassium, rubidium, cesium, beryllium, magnesium, calcium, strontium, barium, manganese, copper, cadmium, silver, zinc, and combinations thereof, whereby to selectively adsorb said pinene isomer from said feed mixture, and thereafter recovering the adsorbed pinene isomer from said adsorbent.

2. The process of claim 1 further characterized in that said selectively adsorbed isomer comprises beta-pinene.

3. The process of claim 1 further characterized in that said adsorbent contains at least one cation selected from the group consisting of potassium, barium, and sodium.

4. A process for separating beta-pinene from a feed mixture comprising pinene isomers which process comprises the steps of:
(a) contacting said mixture at adsorption conditions with a crystalline aluminosilicate selected from the group consisting of type X and type Y zeolites containing at the exchangeable cationic sites within said zeolite at least one cation, selected from the group consisting of lithium, sodium, potassium, rubidium, cesium, beryllium, magnesium, calcium, strontium, barium, manganese, copper, cadmium, silver, zinc, and combinations thereof, thereby selectively adsorbing beta-pinene;
(b) withdrawing from the adsorbent bed a stream comprising the less selectively adsorbed isomer in the feed;
(c) contacting the adsorbent at desorption conditions with a desorbent material to effect the removal of beta-pinene from the adsorbent; and,
(d) withdrawing from the adsorbent a stream comprising desorbent material and said beta-pinene.

5. The process of claim 4 further characterized in that said feed mixture comprises turpentine.

6. The process of claim 4 further characterized in that said adsorbent contains at least one cation selected from the group consisting of potassium, sodium, barium and combinations thereof.

7. The process of claim 6 further characterized in that said adsorbent contains potassium cations as the major cation at the cationic exchangeable sites within the adsorbent.

8. The process of claim 6 further characterized in that said adsorbent contains sodium cations as the major cation at the cationic exchangeable sites within the adsorbent.

9. The process of claim 6 further characterized in that said adsorbent contains barium and potassium at the cationic exchangeable sites within the adsorbent.

10. The process of claim 4 further characterized in that said adsorption and desorption conditions include temperatures within the range of from about 70° F. to about 150° F. and pressures from about atmospheric to about 500 p.s.i.g.

11. The process of claim 4 further characterized in that said desorbent material comprises linear olefins having a different boiling point than that of the feed mixture.

12. The process of claim 4 further characterized in that said desorbent material comprises a mixture of linear olefins and paraffins having a different boiling point than that of the feed mixture.

13. A process for separating beta-pinene from a feed mixture comprising beta-pinene and alpha-pinene which process comprises the steps of:
- (a) contacting the feed, at adsorption conditions with a type X structured zeolite containing potassium at the exchangeable cationic sites within said zeolite, thereby selectively adsorbing beta-pinene;
- (b) withdrawing from the adsorbent bed a stream comprising less selectively adsorbed alpha-pinene;
- (c) contacting the adsorbent at desorption conditions with a desorbent material comprising linear olefins having a different boiling point than that of the feed mixture to effect the removal of beta-pinene from the adsorbent; and,
- (d) withdrawing from the adsorbent a stream comprising desorbent material and said beta-pinene.

14. The process of claim 13 further characterized in that said adsorption conditions and said desorption conditions include temperatures within the range of from about 70° F. to about 150° F. and pressures from about atmospheric to about 500 p.s.i.g.

15. The process of claim 13 further characterized in that said type X structured zeolite contains from about 0.5 to about 5 weight percent water on a volatile-free basis.

16. The process of claim 13 further characterized in that said linear olefins have from 4 to 8 carbon atoms per molecule.

References Cited

UNITED STATES PATENTS

| | | | |
|---|---|---|---|
| 2,882,244 | 4/1959 | Milton | 252—455 Z |
| 2,985,589 | 5/1961 | Broughton et al. | 260—676 AD |
| 3,201,491 | 8/1965 | Stine et al. | 260—676 AD |
| 3,265,750 | 8/1966 | Peck et al. | 260—677 AD |
| 3,270,075 | 8/1966 | Derfer et al. | 260—675.5 |
| 3,510,423 | 5/1970 | Neuzil et al. | 208—310 |
| 3,642,928 | 2/1972 | Davis | 260—675.5 |
| 3,696,164 | 10/1972 | Davis | 260—675.5 |
| 3,700,746 | 10/1972 | Takacs | 260—675.5 |
| 3,700,747 | 10/1972 | Takacs | 260—675.5 |
| 3,717,572 | 2/1973 | De Gramont | 208—310 |

DELBERT E. GANTZ, Primary Examiner

G. E. SCHMITKONS, Assistant Examiner

U.S. Cl. X.R.

208—Dig. 2, 310; 260—676 AD, 677 AD